United States Patent
Bae et al.

(10) Patent No.: US 7,327,866 B2
(45) Date of Patent: Feb. 5, 2008

(54) METHOD AND APPARATUS FOR COMPRESSING COMPUTED TOMOGRAPHY RAW PROJECTION DATA

(76) Inventors: Kyongtae T. Bae, 3 Fleetwood Dr., St. Louis, MO (US) 63124; Bruce Raymond Whiting, 1649 Ridge Bend Dr., Wildwood, MO (US) 63038

( * ) Notice: Subject to any disclaimer, the term of this patent is extended or adjusted under 35 U.S.C. 154(b) by 680 days.

(21) Appl. No.: 10/009,239

(22) PCT Filed: Apr. 9, 2001

(86) PCT No.: PCT/US01/11510

§ 371 (c)(1),
(2), (4) Date: Nov. 25, 2002

(87) PCT Pub. No.: WO01/76482

PCT Pub. Date: Oct. 18, 2001

(65) Prior Publication Data

US 2003/0228041 A1    Dec. 11, 2003

(51) Int. Cl.
*G06K 9/00*    (2006.01)
(52) U.S. Cl. ..................... 382/131; 382/128
(58) Field of Classification Search ............ 382/128, 382/130–133, 232–233, 240, 244, 305; 378/4, 378/8; 705/3; 707/204
See application file for complete search history.

(56) References Cited

U.S. PATENT DOCUMENTS 5,543,709 A    8/1996    Kajiyama ............... 324/329
5,724,582 A *    3/1998    Pelanek et al. ............. 707/204
6,215,903 B1 *    4/2001    Cook .......................... 382/232
2002/0009215 A1    1/2002    Amato, III et al.
2002/0028008 A1    3/2002    Fan et al.

(Continued)

FOREIGN PATENT DOCUMENTS

WO    WO 95/15536    6/1995

OTHER PUBLICATIONS

Macq et al. ("Lossless compression for 3D PET", IEEE Transactions on Nuclear Science, vol. 41, No. 6, Dec. 1994, pp. 2765-2770).*

(Continued)

*Primary Examiner*—Duy M. Dang
(74) *Attorney, Agent, or Firm*—Thompson Coburn LLP

(57) ABSTRACT

A method and apparatus for compressing computed tomography raw image data includes taking image data with a CT scan, stripping away any proprietary frame or reference data, compressing the data using a compression software such as JPEG-LS, and then storing or transmitting the data over a network or the like to another computer or storage/display device. The compression software may be conveniently stored in a computer and ready for processing of the raw CT scan data. The compressed raw CT scan data may then be used to reconstruct images, as desired, at a later date. By compressing the raw data, it is possible to later reconstruct additional or different views than those taken or used at the time of original diagnosis as may be useful for diagnosis of other medical conditions later discovered or to verify a diagnosis previously taken with the exact same data used by the medical professional during the original diagnosis. The original identifying data may also be stored and/or transmitted to allow accurate reconstruction of the original views.

7 Claims, 9 Drawing Sheets

U.S. PATENT DOCUMENTS

2003/0228041 A1    12/2003    Bae et al.
2004/0097875 A1    5/2004    Bae

OTHER PUBLICATIONS

Macq B. et al, "Lossless compression for 3D PET", 1993 Nuclear Science Symposium and Medical Imaging Conference, San Francisco, CA, USA, Oct. 30-Nov. 6, 1993, vol. 41, No. 4, pt. 1, pp. 1556-1559, XP002181660.

Weinberger et al, "From LOCO-I to the JPEG-LS standard", Image Processing, 1999. ICIP 99. Proceedings. 1999 International Conference on Kobe, Japan Oct. 24-28, 1999, Piscataway, NJ, USA, IEEE, US Oct. 24, 1999, pp. 68-72, XP010368687.

Weinberger et al, "LOCO-I: A low complexity, context-based, lossless image compression algorithm" Data Compression Conference, IEEE Computer Society Press, Los Alamitos, CA, US, Mar. 31, 1996, pp. 140-149, XP000614253.

Young S.S. et al, "Statistically lossless image compression for CR and DR", Proceedings of the SPIE, Bellingham, VA, US, vol. 3658, Feb. 21, 1999, pp. 406-419, XP001039680.

Crawford et al.; "Computed Tomography Scanning With Simultaneous Patient Translation"; *Am. Assoc. Med. Phys.*; Nov./Dec. 1990; pp. 967-982; vol. 17(6).

Kak et al.; "Algorithms for Reconstruction with Nondiffracting Sources"; *Principles of Computerized Tomographic Imaging*; 1987; pp. 49-112; Chapter 3; The Institute of Electrical and Electronics Engineers, Inc.; New York.

Kalender et al.; "A Comparison of Conventional and Spiral CT: An Experimental Study on the Detection of Spherical Lesions"; *Journal of Computer Assisted Tomography*; Mar./Apr. 1994; pp. 167-176; vol. 18(2); Raven Press, Ltd.; New York.

Rabbani et al.; *Digital Image Compression Techniques*; 1991; pp. 1-220; vol. TT 7; Spie Optical Engineering Press; Bellingham, Washington.

FCD 14495; "Lossless and Near-Lossless Coding of Continuous Tone Still Images" (JPEG-LS); 1997; pp. 1-75; Public Draft; ISO/IEC Copyright Office; Switzerland.

Proceedings of the Second International Joint Conference on Pattern Recognition, Aug. 13-15, 1974, Copenhagen; IEEE, Washington, 1974, pp. 258-263, XP002023478, D. H. Ballard et al.; "Hierarchic Recognition of Tumors in Chest Radiographs".

Computer Vision Graphics and Image Processing, vol. 43, No. 2, Aug. 1988, MA US, pp. 256-264, XP000004392, S.M. Ali et al., "A New Algorithm for Extracting the Interior of Bounded Regions Based on Chain Coding".

\* cited by examiner

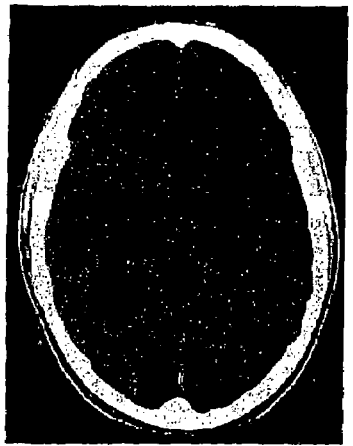 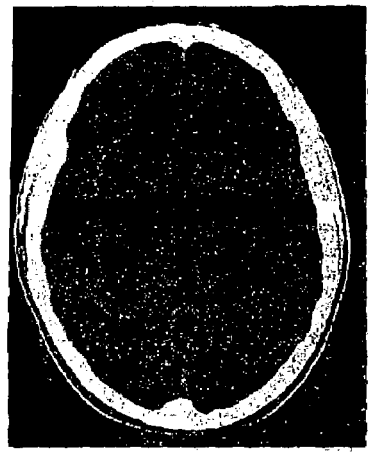 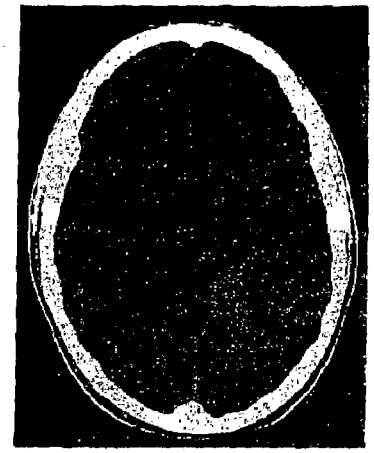
FIGURE 5A   FIGURE 5B   FIGURE 5C
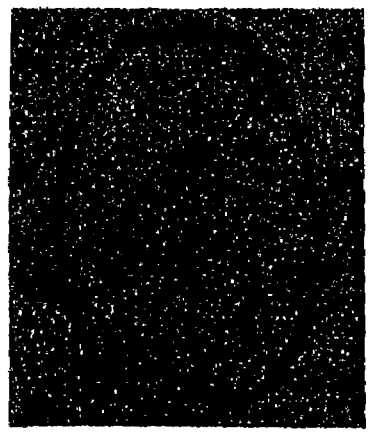 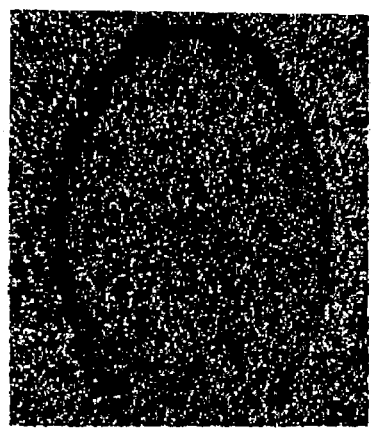
FIGURE 6A   FIGURE 6B

METHOD AND APPARATUS FOR COMPRESSING COMPUTED TOMOGRAPHY RAW PROJECTION DATA

BACKGROUND AND SUMMARY OF THE INVENTION

Computed Tomography (CT)

Computed Tomography (CT) is a diagnostic imaging modality that produces three dimensional (3D) images of the body by making multiple x-ray exposures at different locations around the patient. The basic system comprising a CT scanner as well known in the art includes a scanning gantry, x-ray generator, computer system, viewing and operator consoles, and a hard copy camera, all as shown in FIG. 11. The scanning gantry as well known in the art contains an x-ray tube, collimator, detector array, and associated data acquisition electronics. The CT scanning process involves collecting raw projection data by means of projecting highly collimated x-rays across a patient from different orientations. From these raw projection data (the sinogram), the internal structure of the object can be computed by various reconstruction schemes [Kak & Slaney]. Because of its medical utility, the use of CT imaging continues to grow, and with it the amount of patient data that must be handled, transmitted and stored.

Advances in CT Technology

Recent advances in technology, such as helical or spiral scanning with slip-ring design [Crawford] and multirow detector technology, enable faster scanning of more patients and larger volumes for each patient. A slip-ring technology allows continuous rotation of the x-ray tube and detector array assembly. Spiral CT has reduced scan times and allowed for continuous data acquisition for volumetric medical imaging. Because the raw data are acquired in a continuous fashion in spiral CT, any transverse slice can be specified for reconstruction at any longitudinal interval of scanning. These images generated with a small reconstruction increment provide overlapping image slices and thus improve both for high- and low-contrast resolution [Kalender et al.]. Improving longitudinal resolution due to overlapping reconstruction is important for volumetric imaging, as the in-plane resolution is usually much higher (on the order of 5-10) than the longitudinal resolution. For example, high-resolution CT images of the cochlea are obtained by scanning the cochlea and temporal bone with 1 mm collimation but reconstructing images at every 0.1 mm. In general, a higher image resolution provides a better diagnosis and finer assessment of small structures such as a stenosis in a vessel. Thin slice volume scanning is particularly useful for virtual colonoscopy and CT angiography. Thus, there is a trend to conduct higher resolution tomography which increases the amount of data to be handled and stored.

A recent development in technology is the introduction of multirow detector CT scanners. Instead of the 1-dimensional detectors, these scanners use 2-dimensional detectors that consist of several arrays of detectors. Thus, when using a scanner having n detector arrays, the volume scan time T to obtain the same amount of data is reduced to roughly T/n. In addition, the x-ray tube's output can be more efficiently used.

Increase in CT Data

Data volumes have increased tremendously with new faster and finer CT scanners. In order to handle the large data volumes, advances in computer technology and storage devices are necessary. In addition, advances in digital technology and algorithm development allow interactive and more thorough display of patient image data by physicians and radiologists, for example in Picture Archiving and Communication Systems (PACS) or with Computer Aided Diagnosis (CAD). Thus, the volume of CT digital data that must be accommodated is constantly increasing, and expected to continue increasing. In the prior art, CT images were printed on laser film, viewed on a light box, and stored in film folders in a film library. However, the costs for manual labor, propensity to misplace films, and need to distribute images to multiple caregivers in different locations has motivated the development of PACS. A serious challenge to implementing PACS is the amount of data that must be accommodated. CT images typically consist of 512 by 512 pixels, with 12 bits of gray scale resolution, so each image is about 0.5 MB (4,000,000 bits) in size. There may be 100-200 images for each patient study, so the complete data set may reach more than 100 MB. Because of this large size, digital data sets representing images are usually only temporarily saved, with the ultimate record of patient images being the physical film copy. However, the advent of digital systems is making the storage of digital image data more compelling. Also, as computers become less expensive and more powerful, it is possible to have distributed workstations to reconstruct images from raw data for diagnostic viewing. In this case, large data files must be transmitted across the network, requiring waits of long duration. Decreasing the size of files to be transmitted would increase system performance.

Advantages of Storing Raw Data Rather Than Image Data

One of the important features of spiral CT is that retrospective reconstruction can be performed. Spiral raw data are collected at first and stored instead of reconstructed images. Then, these raw data can be recalled later to generate images with different reconstruction increments depending on clinical applications. Similarly, in a multirow spiral CT, images with different slice thickness can be generated from the same set of raw data, depending on clinical applications. Thus, there is a need in the art, and a perceived benefit, for storing raw data as it allows a medical professional to revisit not only the same images previously used (by saving the particular index identifying the views then reviewed), but also to consider the additional input of views not previously considered which can be freshly constructed from the raw data. This can help a medical professional giving a second opinion, the same medical professional who might want to reconsider his original opinion, or even to possibly do other diagnoses from data not previously considered or relating to the prior medical symptom. However, despite these added benefits of having original raw data, present practice is to save only the image data and the raw data are deleted at the time of image data archival, as the raw data is typically 3-6 times larger than the image data for a given slice coverage. For example, for a chest CT examination to cover 30 cm with 1 mm collimation and 1.5 table increment, the size of raw data is 400 MB, while the size of 60 images with 5 mm slice thickness is 30 MB. Thus, the trend in the prior art is to focus on starting with the image data and then to work on finding better ways to save or store it as the overwhelming crush of image data alone is generally considered monumental so that those of skill in the art don't seek to compound the problem by choosing an inherently larger data set to begin with.

Prior Art Image Data Compression

Methods considered in the prior art for reducing the amount of data to be handled and stored include image data compression; using transformations and encoding to represent image information with fewer bits [Rabbani and Jones]. Many schemes have been attempted to do this [Foos]. One class of algorithms, called lossless, produces no change in the final data. However, because of the information content (entropy) of the image, compression ratios achieved by this technique are typically in the range of 2-3 to 1 and are thus of limited value. Techniques that allow differences between the original and reconstructed compressed image can reach much higher compression ratios, with more compression generally resulting in higher distortion of the final image upon recall. Studies have shown that recalled CT images with compression ratios in the range of 8:1 have observable distortions, which may affect the confidence of the interpretation by radiologists. In the present legal and medical environment, such levels of compression are thus not practical as in many cases the true value of image storage is to accurately reproduce what the medical professional made reference to when the initial diagnosis was made. Introducing artifacts into the recalled image interferes with this purpose which may even defeat the value of storing any particular image.

Under present prior art medical practice, the original raw projection data that is used to reconstruct image slices is routinely kept for only a day or so, in case further views are needed for diagnosis. The size of the projection data can be quite large, as each measurement involves approximately 1000 detectors, with tens of thousands of measurements across the volume, resulting in data sizes of 100 MB per patient. In fact, the size of the projection data is usually as large or larger than the total reconstructed image slices. Therefore, it is not normally saved with the digital image data for a typical clinical examination except for special research purposes.

Thus there is a long felt need to more effectively manage digital data for CT imaging in general, and a teaching in the prior art that compressing image digital data is the only option to reduce the size of the data to be saved.

BRIEF DESCRIPTION OF THE DRAWINGS

FIGS. 2a & b are images of a sinogram compressed by 12:1 from FIG. 1b, and a difference image representing the differences between FIG. 1b and FIG. 2a;

FIGS. 5a, b & c are head images without compression, reconstructed from 12:1 sinogram compressed data, and compressed with 12:1 compression ratio;

FIGS. 6a & b are difference images between the original and the 12:1 sinogram compressed data set, and the original and the 12:1 compressed image data set;

DETAILED DESCRIPTION OF THE PREFERRED EMBODIMENT

Figure 1A:
FIGS. 1a & b are images of a non-spiral abdominal CT image, and its sinogram.

This invention involves an improved method to reduce the amount of digital data required for creating CT images for diagnostic purposes. The inventors have discovered that by compressing the raw digital projection data, its size can be efficiently reduced while preserving useful diagnostic information sufficient to reconstruct not only the original images but also new views captured within the projection data. Having the original projection data available provides the additional benefit of allowing additional viewing and processing at a later date such as might be beneficial for legal purposes, or even to provide for second opinions or for other diagnostic purposes.

The raw projection data is sometimes termed a "sinogram" in the industry, because the data appears as a set of sinusoidal paths during the scan. This is caused by the superposition of objects in the transmitted x-ray beams and results in a sinogram "image" with a highly correlated structure. This correlation of the projection data allows certain compression schemes to efficiently reduce the amount of stored data. The sinogram can correspond to a stationary scan of a single plane (leading to a "step and repeat" acquisition process for the full volume) or the continuous movement of the object during the scan ("helical" or "spiral" CT). To generate high quality images, many samples of the projection beam are required: there are typically 1000 detectors that may each take 1000 measurements per complete revolution of the x-ray source. To cover the desired volume, there may be 10-40 revolutions required, resulting in hundreds of megabytes of projection data per patient scan.

Reconstruction processes, such as filtered back projection or simultaneous algebraic reconstruction, produce planar image slices from the sinogram data. While the sinogram contains information about all objects in its field of view (FOV, on the order of 50 cm), typically only a small area is of interest, so after a preview a subset region of interest is reconstructed and ultimately saved. Thus, schemes that compress images may have the advantage that smaller, more correlated data sets are addressed—but at the expense of loss of information about the whole view of the patient and alternative views of the area of interest.

As an example of the present inventive technique, CT data sets were acquired from a Siemens Somatom Plus 4 Scanner. Sinograms consist of either 768 or 1536 detectors with 1252 samples per gantry revolution. It should be noted, although well known to those in the art, that each CT manufacturer provides its sinograms written in a proprietary format, so some limited amount of decoding is required to arrive at the true projection data. For instance, the data file usually has a header section, wherein text or binary information is stored that records the patient name, time of scan, hospital location, etc. This information must be preserved without loss, so it is handled separately. (Usually it is small in size, such as 4096 or 8192 bytes in length.) Also, there may be digital information mixed in with the scan signal measurements, such as data recording the table position, gantry angle position, amplifier gain factor, etc., of each measurement line. Again, the size of this information is small (tens of bytes per gantry position) and must be preserved without loss, so it is separated and saved without compression. The sample data was extracted and processed into units representing the logarithm of the ratio of the unattenuated x-ray beam to the transmitted x-ray beam. However, other data representations may be used as is convenient to the particular CT scanner data set output. This data set was then compressed using the JPEG-LS software [Weinberger, ISO/IEC 14995], which uses a low complexity pattern generation and run-length encoding scheme to represent information. The amount of compression is controlled by specifying the maximum allowable error between an original pixel value and the reconstructed one, e.g., error=2 means that all pixels in the final image will be within 2 counts of their original value. By specifying an error of 0, the compression will be lossless. By specifying the allowable error to be some multiple of the intrinsic noise in the CT acquisition process, the error introduced will be on the order of the underlying physical noise and therefore be minimally objectionable [Young, et al.]. For sinogram data, the prime noise source is the quantum statistics of the x-ray photons. The signal-to-noise ratio increases as the square root of the number of photons detected. Since the signals are encoded in attenuation (logarithmic) space, the noise associated at any level will be a constant times one-half the attenuation number. Thus, the preferred embodiment is to transform the stored attenuation code value by quantizing it in steps proportional to some linear fraction of its value. The proportionality constant is determined by measuring the standard deviation of the signal level at some particular set of the scanner parameters of collimation, rotation time and tube current. The product of these three determine the x-ray flux that is sensed by the detector. Therefore from a measurement of the standard deviation of the signal at single scanner combination, one scales the quantization step by the ratio of the product of the three parameters. For example, if the standard deviation in a uniform region of the sinogram signal (at value 10000 code values) is 10 code values for scanner parameters of 3 mm collimation, 150 mA tube current and gantry rotation time 750 ms, the quantization step at signal level 5000 would be 5 code values. If another scan was made on the same scanner with 300 mA, the quantization step for code value 10000 would be reduced to 5 code values. Encoding with this quantization scheme gives the minimum entropy for the code values, which are then compressed as above. When the compressed data is needed for image reconstruction, e.g., after retrieval from a storage device or transmission across a network, the compressed signal data is reconstituted by an inverse mapping of the compressor (and quantizer if necessary), the digital data (header and information words) are added in their original location, and the data file is ready for computation.

The sample sinograms were compressed by varying amounts and then returned to the CT console for reconstruction. Also, images reconstructed from the original sinogram were compressed by varying amounts and decompressed for comparison. It was found that the compression ratio for a given specified error depended greatly on the scene being compressed, so the program was varied to achieve comparable compression ratios for image comparison. Observation of the images determined that compression ratios of less than 15:1, and preferably between 7:1 and 10:1, gave clinically useful images, while higher compression ratios compromised diagnostic utility. At comparable compression ratios, images from the compressed sinograms were similar in quality to images that had been directly compressed, even though the compressed images covered only ½ to ¼ of the total area of the sinogram. Artifacts introduced by compressing sinograms tended to be of lower spatial frequency, and therefore degraded high contrast regions less. These images and related difference images and other data are shown in FIGS. 1 to 9 appended hereto.

Still another set of examples are reported as follows. Clinical diagnostic images of chest, abdomen, and head were collected along with their corresponding raw projection data (sinograms) from a Somatom Plus-4 scanner (Siemens Medical Systems, Iselin, N.J.). The chest projection scan was obtained from a patient with a spiculated lung nodule using a high-resolution spiral CT technique (collimation 2 mm and pitch 1). The abdomen scan was acquired using a standard non-spiral technique with 8 mm collimation to evaluate for a questionable liver mass, while the head scan was acquired using the same non-spiral technique to evaluate for a severe headache. These scans were diagnosed normal. It was our intention to test the compression technique in both spiral and non-spiral scans. In our data set, the choice of spiral or non-spiral CT scans for a body part was arbitrary and based on the availability of scans at the time of data collection. The collected CT images and their sinograms were electronically transferred to a workstation.

Sinograms consisted of either 768 or 1536 detectors with 1252 samples per gantry revolution. The data were extracted and processed into units representing the logarithm of the ratio of the unattenuated x-ray beam to the transmitted x-ray beam. Data compression was performed using the JPEG-LS implementation (LOCO, Hewlett-Packard, Palo Alto Calif.), which uses a low complexity pattern generation and run-length encoding scheme for data representation. The program executed rapidly, encoding or decoding at a speed of approximately 1 megabytes/sec.

Sinograms were compressed and decompressed, and then transferred back to the CT scanner console for image reconstruction. Also, images reconstructed from the original sinogram were compressed by compression ratios comparable to the sinogram compression and decompressed. It was found that the compression ratio for a given specified error depended on the details of the scanned object being compressed, therefore, program parameters were varied to achieve comparable compression ratios for image comparison.

Images from compressed sinograms were compared with those from direct image compression. For each of the three body types, image sets (consisting of an original, images compressed at three levels, and images reconstructed with three levels of compression) were viewed on the scanner console workstation. The quality of these images was directly compared using a side-by-side display. No systematic or blinded analysis to grade the image quality was attempted. Qualitative properties examined included low level contrast in homogeneous portions of image, edge distortion, and artifact visibility. In addition, a difference image between the original and compressed images was generated for each image data and studied for correlated structure or artifacts. The root mean square error (RMSE) of the difference, which is a commonly used engineering metric for image degradation, was computed for a quantitative measure.

RESULTS

Figure 1B:
Figure 2A:
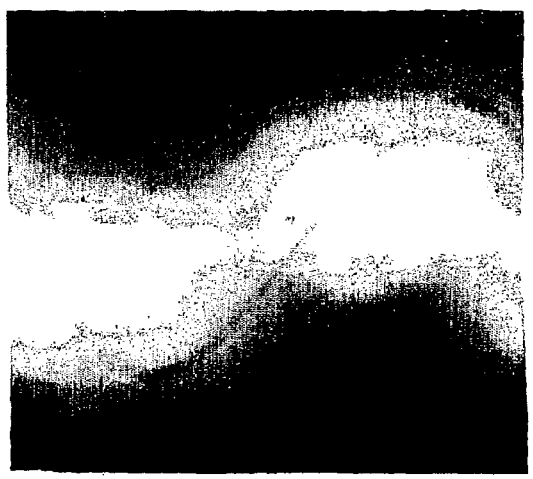
Figure 2B:
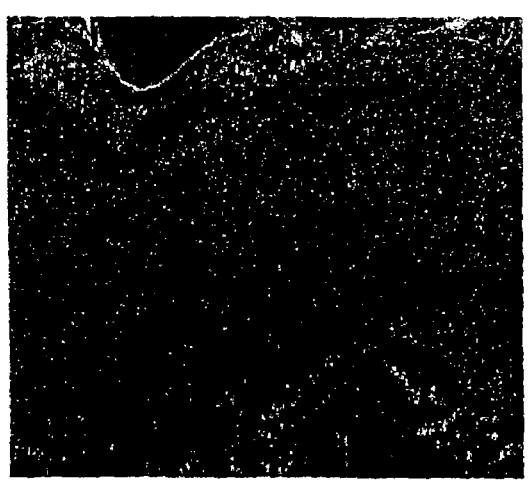

A non-spiral abdominal CT image, its original and 12:1 compressed sinograms, and the difference of these sinograms are shown in FIGS. 1 and 2. The x-coordinate of the sinogram represents the loci of the x-ray tube, while the y-coordinate represents the loci of the detectors. Each horizontal line of the sinogram represents transmitted x-ray beam signals recorded at each detector during one revolution of the CT gantry. The bright, white-cloud area of the sinogram corresponds to the abdomen cross-section, while the peripheral dark area corresponds the surrounding air. Although it is difficult to distinguish the compressed from the original sinograms by visual inspection, the difference is the most prominent at the boundaries of the abdomen, the CT table, and air because of the homogeneous texture of unattenuated x-rays in air.

Figure 3A:
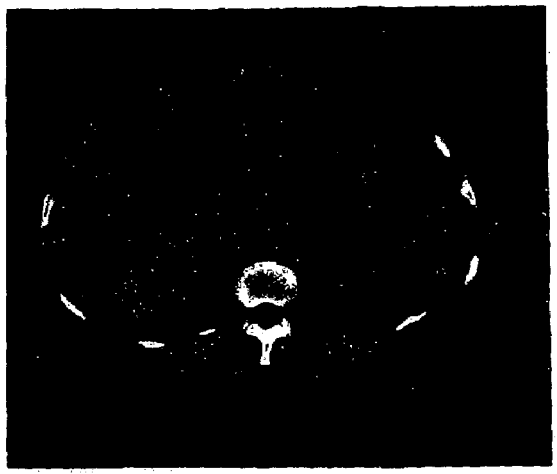
FIGS. 3a & b are an image reconstructed from the 12:1 compressed data of FIGS. 2a, and an original image compressed with 12:1 ratio.
Figure 3B:
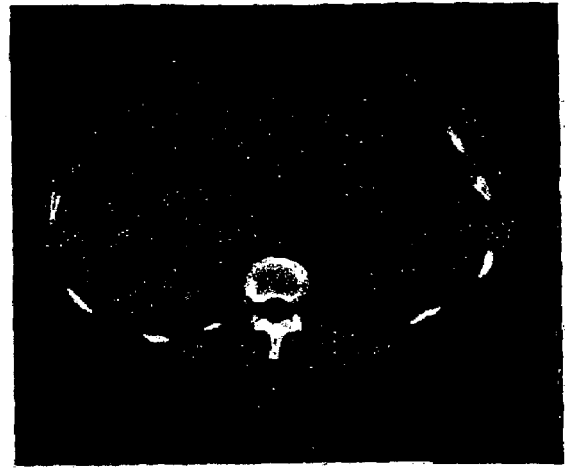
Figure 4A:
FIGS. 4a & b are images showing differences between the original and FIG. 3a and differences between the original and FIG. 3b.
Figure 4B:
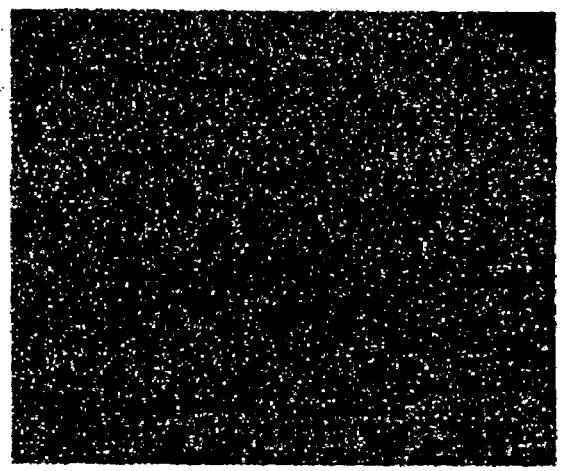

An image reconstructed from the 12:1 compressed sinogram in FIGS. 1 and 2 and an image with 12:1 direct compression are shown in FIGS. 3A and 3B, respectively. Difference images were generated between the original and the sinogram-compression images and between the original and the direct-compression images, shown in FIGS. 4A and 4B, respectively. These compressed abdominal images were not easily discernible from the original image in FIG. 1A. Compared to the sinogram-compression image, however, the direct-compression image demonstrated a slight increase in low-level white noise, particularly in homogenous areas of the subcutaneous fat and the liver. This increase in low-level noise is clearly demonstrated qualitatively in the difference images and quantitatively from the computation of the root mean square errors (RMSE) of the difference images. The RMSE that quantifies the magnitude of noise was 10.62 and 13.47 in the difference images from the sinogram-compression and the direct-compression, respectively. No high-level structural noise or artifacts were introduced from the compression.

A non-spiral head CT image, its original and 12:1 compressed sinograms, and the difference between these sinograms are shown in FIG. 12. The cross-sectional area of the head is smaller than that of the abdomen, resulting in a larger area of air space in surrounding the head in the CT scan. This large air space is clearly delineated in the sinograms. An image reconstructed from the compressed sinogram in FIG. 12 and an image with 12:1 direct compression are shown in FIGS. 5B and 5C, respectively. Although these images were difficult to discern from the original, the direct-compression image showed more increase in low-level white noise than the sinogram-compression image. This increase in noise was confirmed in the difference images, as shown in FIGS. 6A and 6B, and was quantified in the RMSE measurements: 2.35 in the direct-compression image difference and 1.46 in the sinogram-compression image difference.

Figure 7A:
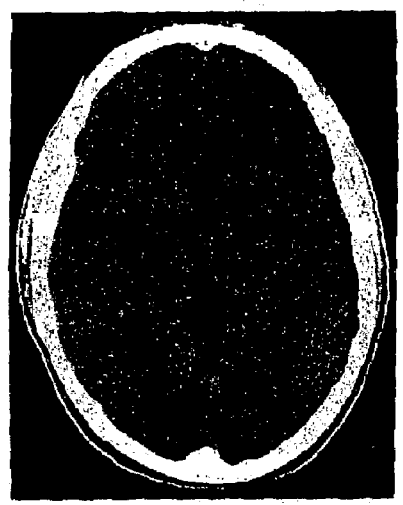
FIGS. 7a & b are a head image reconstructed from a 23:1 sinogram compressed data set, and a 20:1 direct compression.
Figure 7B:
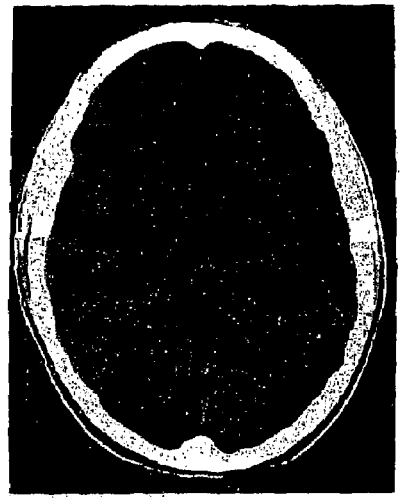

The head image reconstructed from a 23:1 sinogram compression is shown in FIG. 7. For comparison, a direct-compression image was generated from the original image with 20:1 compression ratio (FIG. 7). Both images were profoundly degraded from the original image. Marked increase in low-level noise was observed in the sinogram-compression image, resulting in a substantial loss of the gray and white matter differentiation. On the other hand, the direct-compression head image showed more severe image degradation and the presence of high-level structural noise and streaky artifacts.

Figure 8A:
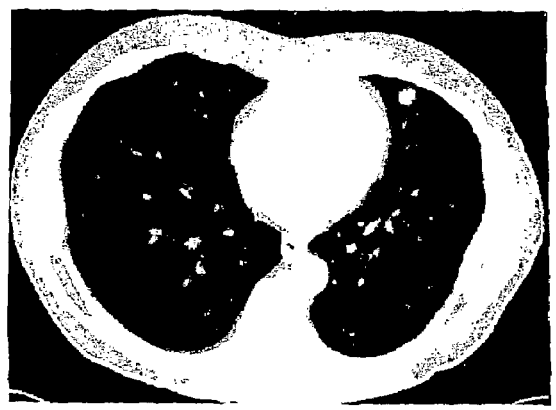
FIGS. 8a & b are a spiral chest image with a nodule, and its corresponding sinogram.
Figure 8B:
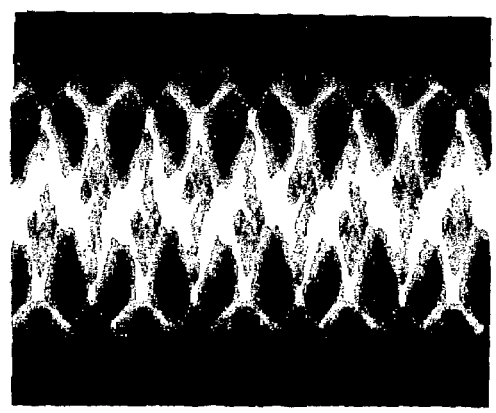
Figures 9A, 9B, 9C:
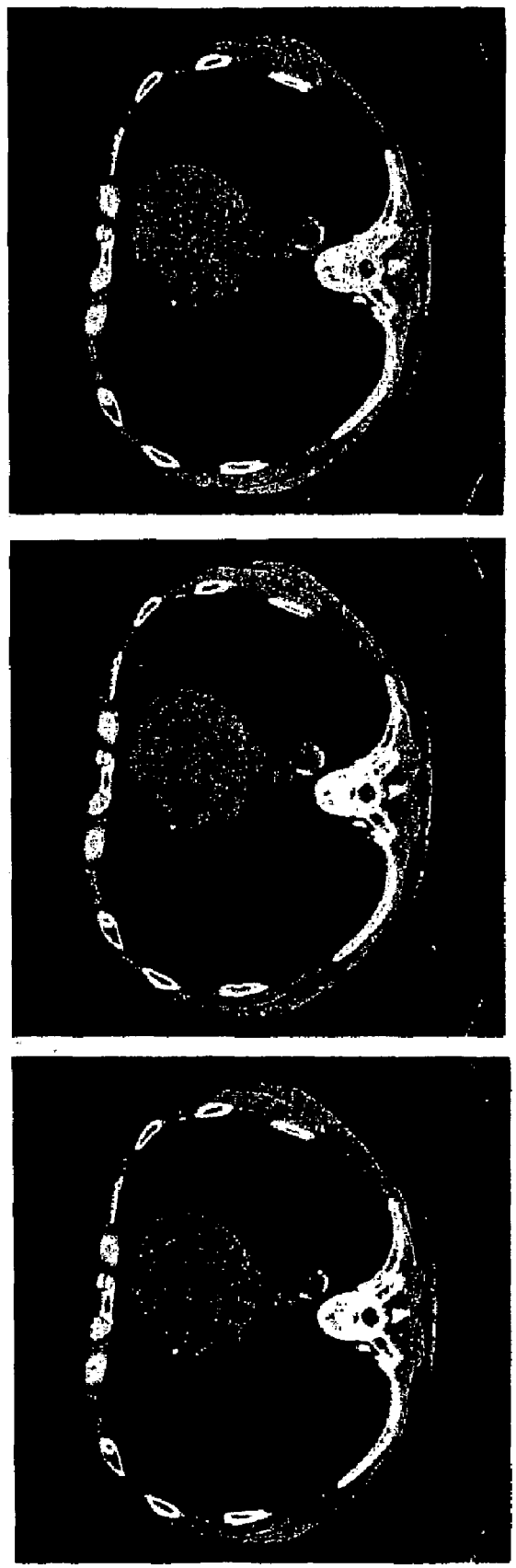
FIGS. 9a, b & c are spiral chest images without compression, reconstructed from a 12:1 sinogram compressed data set, and compressed with 12:1 compression ratio.
Figure 13A:
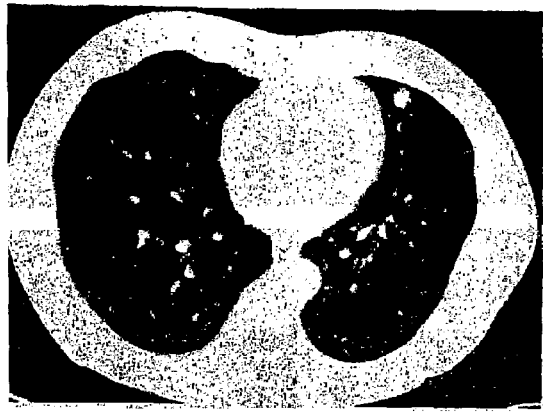
Figure 13B:
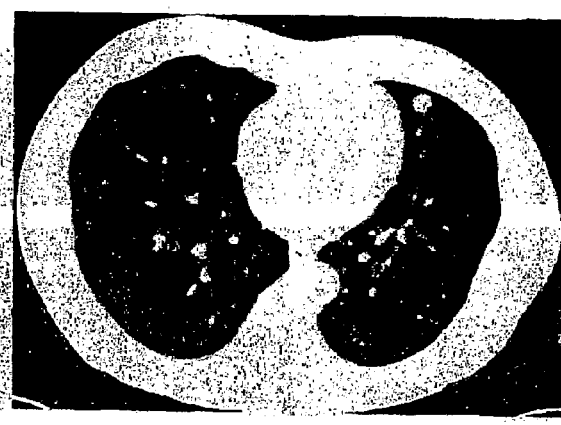
Figure 13C:
Figure 13D:

An image from a spiral lung CT scan is shown with its spiral sinogram in FIG. 8. At the same slice level, an image was reconstructed from 12:1 sinogram compression in a lung window (FIG. 13A) and a soft-tissue window setting (FIG. 13C). For comparison, a 12:1 direct-compression image was generated in a lung window (FIG. 13B) and a soft-tissue window setting (FIG. 13D). The images displayed in the soft-tissue window setting show slightly more increase in low-level noise in the direct-compression than the sinogram-compression images, particularly in the heart and subcutaneous fat regions.

Figure 10:
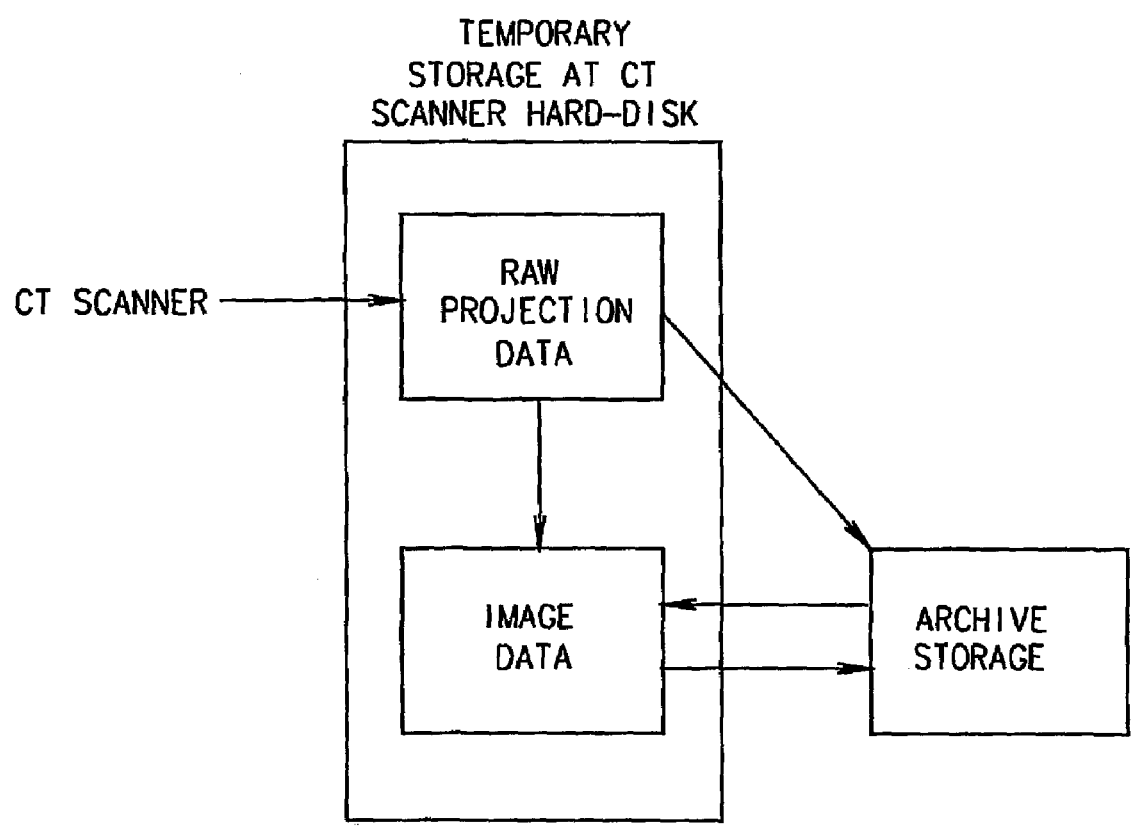
FIG. 10 is a block diagram of a CT scanner detailing the data flows for the data collected and processed in a typical CT scan.
Figure 11:
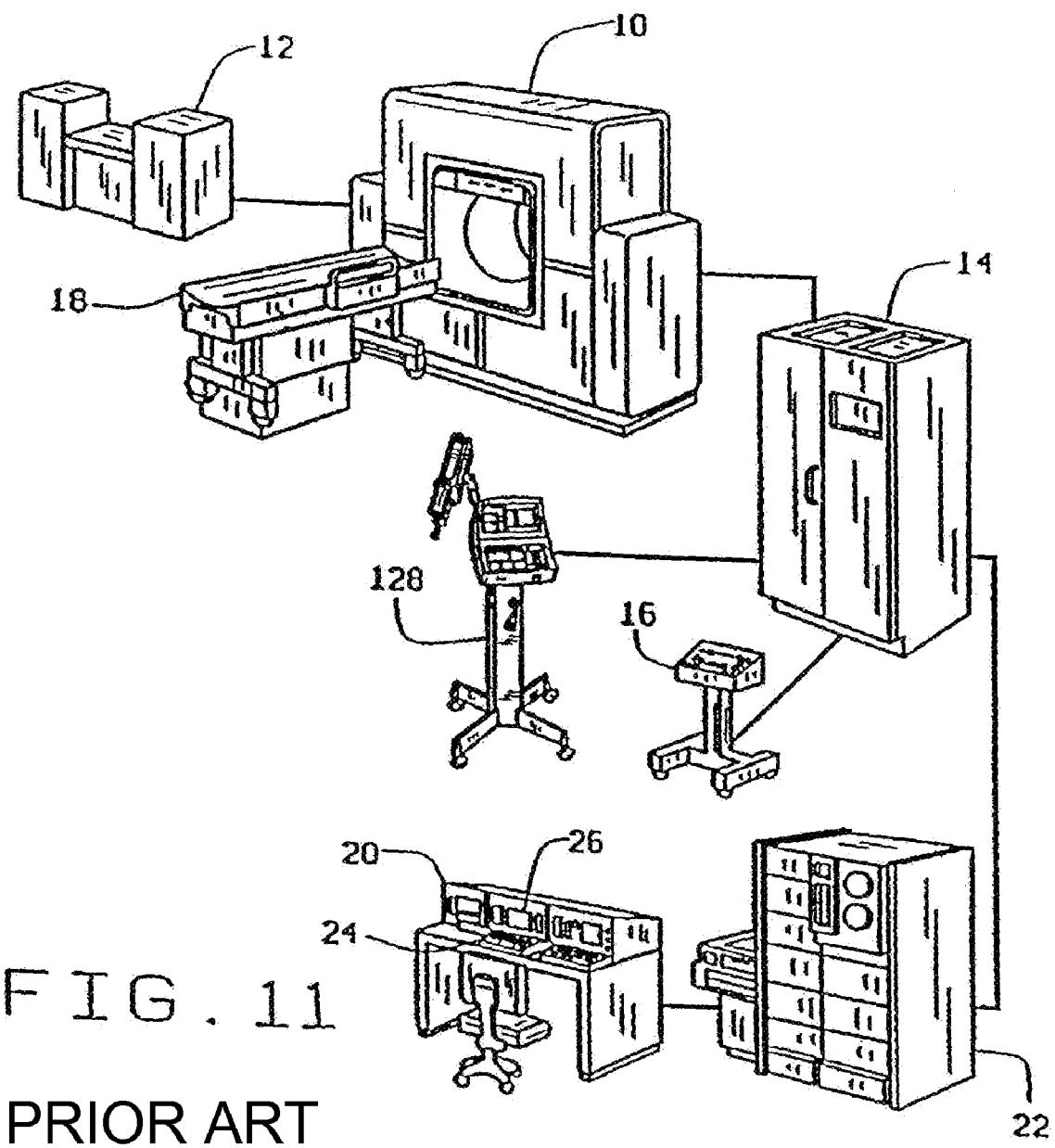
FIG. 11 is a diagram of a CT scanner.
Figure 12A:
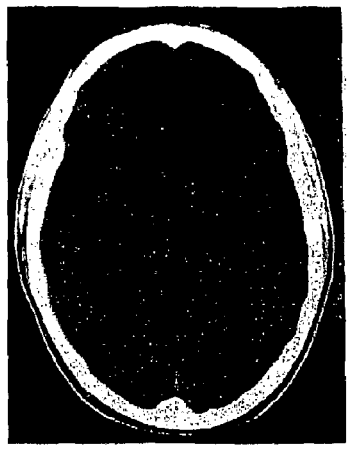
FIGS. 12A, B, C & D, are a Head CT image, its original and compressed sinograms, and FIGS. 13A, B, C & D, are a compressed spiral lung CT image displayed in (A, B) lung windows and (C, D) soft-tissue windows settings.
Figure 12B:
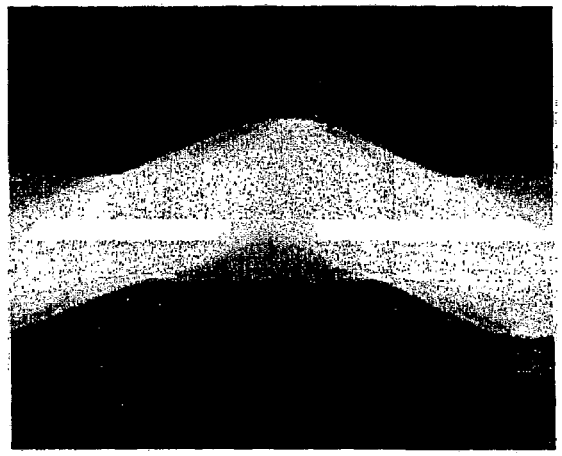
Figure 12C:
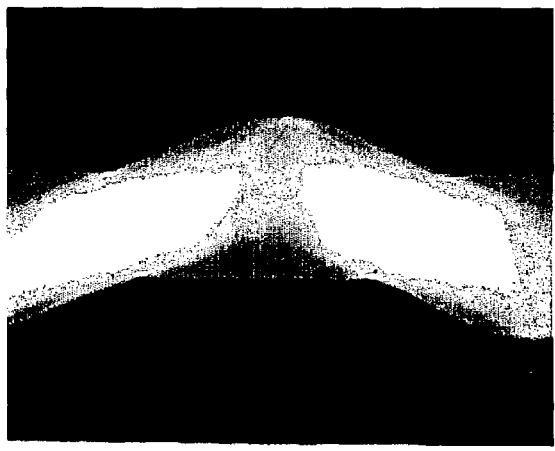
Figure 12D:

In summary, the method of the present invention comprises taking the raw projection digital data from a CT scanner, stripping it out of the proprietary format typically provided by the CT scanner manufacturer if required and as desired for optimum results, and then compressing it including specifying a maximum allowable error of preferably about 8, and preferably at an amount that will achieve a compression of no greater than about 15:1, although the error could be different depending on the particular projection data. The compressed data may then be stored for archival purposes, along with an identifying index representing the particular views constructed and used by a medical professional in performing a diagnosis. Thus, the present method is effective not only to save the raw data, but also to save the necessary information required to reconstruct the particular images known to be accessed by a medical professional in making a diagnosis. Different compression schemes will have varying suitability for compressing sinogram data. Approaches based on wavelet decomposition are expected to be very effective for representing sinograms. Schemes that are based on recognized standards or are of low computational complexity are also desirable. The compression routine used is preferably that provided by JPEG-LS software, although other compression routines could be used so long as they are suited to reliably and effectively compress the data arrays typically found in CT scans, for maximum benefit. Generally, a compression routine is desirable should it be able to significantly reduce the size of the data set given the type of data patterns found in projection data (as known in the art), allow for specifying sufficient information to archive those views considered during a diagnosis, and allow for reliable reconstruction of images from data restored from a compressed data set. These compression routines are preferably preformed on a computer, and even more preferably on the computer typically included as part of a CT scanner, as shown in FIG. 11 with the data flows as shown in FIG. 10. The inventive method also includes reconstructing the projection data from its compressed form, and reconstructing images not only as previously specified by a medical professional but preferably also as might be later used or specified by a different or even the same medical professional. The compressed data set may be stored in any suitable storage medium as known in the art including magnetic or optical disk, tape, etc.

Various changes and modifications to the invention may be made as known to those skilled in the art without departing from the spirit or scope of the invention. The foregoing description of the preferred embodiment should be viewed as illustrative and not exhaustive. The invention should be considered as being limited solely by the claims appended hereto and their legal equivalents.

REFERENCES

The following references are provided as part of this patent application, the entirety of which are incorporated by reference herein.

"JPEG 2000 compression of medical imagery", David H. Foos, Edward Muka, Richard M. Slone, Bradley J. Erickson, Michael J. Flynn, David A. Clunie, Lloyd Hildebrand, Kevin Kohm, Susan Young ISO/IEC 14995-1 FDIS (Final Draft International Standard), "Information technology—Lossless and near-lossless coding of continuous-tone still images: Baseline", JPEG-LS standard, Part 1 (March 1999).

M. Rabbani and P. W. Jones, *Digital Image Compression Techniques*, Vol. TT7, SPIE Press, Bellingham, Wash. (1991).

S. Young, B. Whiting, D. Foos, "Statistically lossless image compression for CR and DR," *Proc. SPIE* 1999, Vol 3658, pp. 406-419.

Kak A C, Slaney M, (1988) *Principles of Computed Tomography*, IEEE Press 1988 (www.slaney.org/pct)

Kalender W A, Polacin A, Suss C, "A comparison of conventional and spiral CT: an experimental study on the detection of spherical lesions", J Comput Assist Tomogr. 1994 March-April;18(2):167-76.

M. Weinberger, G. Seroussi, G. Sapiro, "The LOCO-I Lossless Image Compression Algorithm: Principles and Standardization into JPEG-LS", Hewlett-Packard Laboratories Technical Report No. HPL-98-193R1, November 1998, revised October 1999. To appear in IEEE Trans. Image Processing Computed tomography scanning with simultaneous patient translation, Crawford, et al., Med. Phys. 17(6), November/December 1990, pp. 967-982.

What is claimed is:

1. A method for compressing CT scan digital projection data, which compression allows for later reconstruction of medically useful images from compressed data, said method comprising the steps of:

assembling the CT scan digital projection data in a format suited for compression;

compressing the CT scan digital projection data with compression software into a compressed data set; and controlling the compression by specifying a maximum allowable error between a reconstructed pixel value and an original pixel value to be within two standard deviations of a random noise variance.

2. The method of claim 1 wherein the step of controlling the compression by specifying the maximum allowable error between a reconstructed pixel value and an original pixel value includes controlling the allowable error to be within two counts.

3. The method of claim 1 wherein the step of compressing the CT scan digital projection data includes the step of compressing the CT scan digital projection data on an order of about 15:1.

4. The method of claim 1 wherein the step of compressing the CT scan digital projection data includes the step of compressing the CT scan digital projection data on an order of about 12:1.

5. The method of claim 1 wherein the step of compressing the CT scan digital projection data includes the step of compressing the CT scan digital projection data on an order of less than about 23:1.

6. The method of claim 1 wherein the step of compressing the CT scan digital projection data includes the step of compressing the CT scan digital projection data on an order of between about 12:1 to about 15:1.

7. A method for compressing CT scan digital projection data obtained using an x-ray tube and a known electrical current passing through the tube, which compression allows for later reconstruction of medically useful images from compressed data, said method comprising the steps of:

assembling the CT scan digital projection data in a format suited for compression;

compressing the CT scan digital projection data with compression software into a compressed data set; and determining a compression ratio based in part on multiplying the x-ray tube current and scanner collimation that was used in the CT scan for generating the CT scan digital projection data.

* * * * *